June 8, 1954

D. E. GROVE

CASSETTE

Filed Feb. 13, 1950

2,680,574

INVENTOR.
BY DONALD E. GROVE
Wm. Edward Hann
Attorney

Patented June 8, 1954

2,680,574

UNITED STATES PATENT OFFICE 2,680,574

CASSETTE

Donald E. Grove, Northridge, Calif.

Application February 13, 1950, Serial No. 143,955

2 Claims. (Cl. 242—71)

This invention relates to a film cassette and is particularly adaptable for use in cameras of small dimensions although it is not intended that it be necessarily limited to such uses.

It is a general object of the invention to provide a film cassette which can be made small and compact with relatively light materials, yet which will efficiently hold and permit the feeding of the film to expose successive portions thereof.

A more specific object is to provide a cassette which is so constructed that it can be easily loaded and assembled and wherein the film spool therein contained can be conveniently coupled with a spool drive shaft for rotation of the same.

Another object is to provide a cassette casing which can be easily assembled and securely fastened to produce a small yet sturdy and efficient unit.

A further object of the invention is to provide an improved film block and film guide plate structure.

Still another object of the invention is to provide a simply constructed and highly efficient film spool for use as a part of the cassette.

The above and other objects and advantages of the invention will more fully appear from the following description made in connection with the accompanying drawing wherein.

Figure 1:
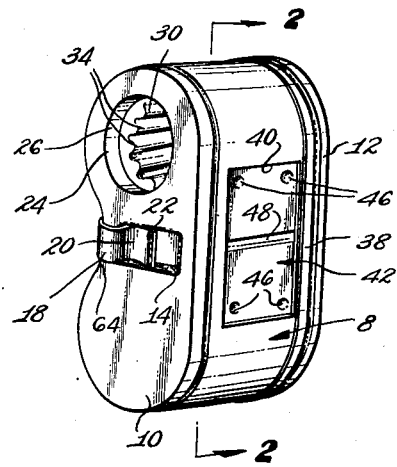
Fig. 1 is a perspective view of the device.
Figure 4:
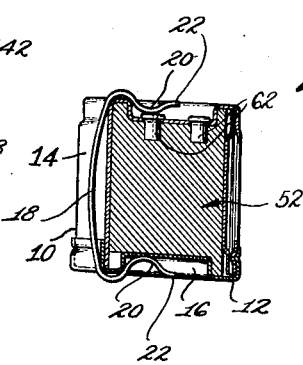
Fig. 4 is a section taken approximately on the line 4—4 of Fig. 2.

There is illustrated a main body or casing 8 having enlarged rounded ends joined by a narrow central portion and having an integral side 10 and a removable side cover 12 shaped to fit the main body or casing. The integral side 10 is provided with a depression 14 and the cover 12 as shown in Fig. 4 is provided with a like depression 16 positioned oppositely to the depression 14. A bow spring 18 is provided with a pair of inwardly bent end portions 20 having outwardly bent extreme tips 22. The ends of the spring 18 are seated in the depressions 14 and 16 as shown in Figs. 1 and 4, and the tension of the spring firmly holds the side cover plate 12 on the main casing 8.

The integral side 10 of the cassette casing is provided with an aperture 24 which is defined by an inwardly extending flange 26 in the side cover plate 12 and opposite to the aperture 24 is an inwardly dished portion 28 whose diameter is approximately the same as that of the flange 26 in the opposite side of the casing.

Figure 7:
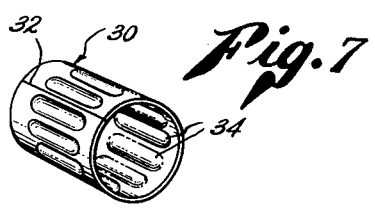
Fig. 7 is a perspective view of the film spool.

A film spool 30 is shown in Fig. 7. It is an open ended hollow cylinder, the ends thereof being of such diameter to receive the flange 26 which lies about the aperture 24 and the dished portion 28 in the removable plate 12. Thus, the spool 30 is rotatably mounted in the cassette 8. The spool is formed from a sheet of metal which is rounded and has edges abutting at 32 as shown in Fig. 7.

About the cylindrical wall of the spool 30 a series of inwardly punched projections 34 is formed. The projections are shown to extend a substantial distance longitudinally of the spool 30 but it should be noted that they terminate some distance from the ends of the spool so that the spool has a smooth cylindrical inner wall portion at each end which serves as a rotary bearing surface. The inward projections 34 are preferably spaced a slight distance apart as best indicated in Figs. 3 and 7, and they serve as a connecting socket which is adapted to receive the end of a spool rotating shaft 36 as indicated in broken lines in Fig. 2. The shaft is received axially in the socket defined by the projections, but when the shaft 36 is rotated, it will engage certain of the projections and produce similar rotation of the spool 30.

Figure 6:
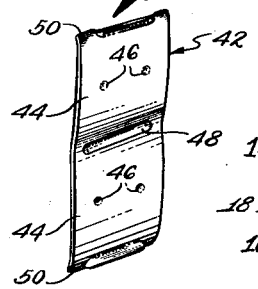
Fig. 6 is a perspective view of the film guide plate.

The casing 8 has a relatively flat front face 38 which is provided with a rectangular aperture 40 comprising a light gate. Inside of the casing 8, and of somewhat greater dimensions than the gate 40, is a film guide plate 42. The guide plate, as shown in Fig. 6 comprises two bowed sections 44 provided with inwardly disposed dimples 46. Across the central portion of the guide plate 44 is an inwardly pressed portion 48. The ends of the guide plate are turned inwardly as at 50 and the intermediate end edges are bent in such a manner that only the end corners of the guide plate provide contact with the interior of the cassette casing face 38.

The central portion of the interior of the cassette casing is provided with a film guide block 52 having a relatively narrow end 54 and a widened end 56 whose face 58 is flat and smooth except for a transverse channel 60 which is adapted to receive the elongated inwardly pressed portion 48 in the guide plate 42. This interconnection between the guide block 52 and the guide plate prevents longitudinal displacement of the guide plate in the cassette. The guide block is secured to the inside of the cassette casing by means of rivets 62.

Figure 2:
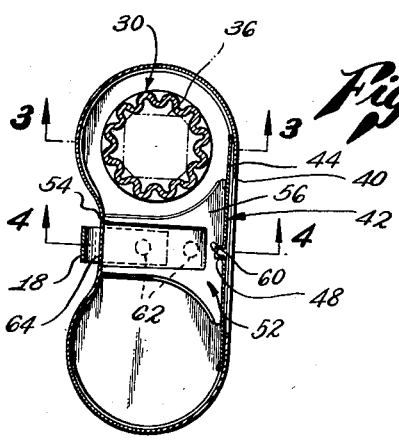
Fig. 2 is a section taken approximately on the line 2—2 of Fig. 1.
Figure 3:
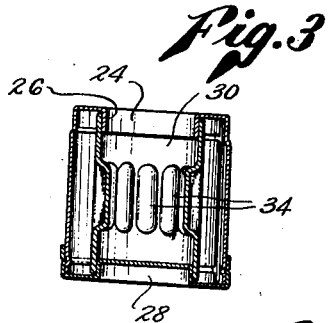
Fig. 3 is a section taken approximately on the line 3—3 of Fig. 2.
Figure 5:
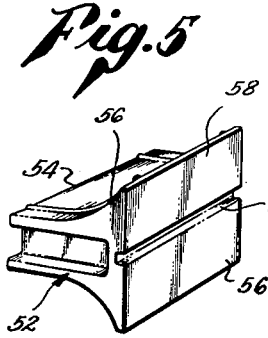
Fig. 5 is a perspective view of the film guide block.

As shown in Figs. 1 and 2 the cassette casing 8 is centrally reduced as at 64 in the rear face of the casing, not only to assist in producing a pair of generally cylindrical chambers within the casing, but also to provide a space in which the bow spring 18 is conveniently located.

The cassette described herein is preferably made of relatively light weight metal except for the film guide block 52, the latter being moulded solid for purposes of convenience in manufacture. The structure is such that it can be economically stamped and readily assembled. While, as stated above, it can be used in any desired size, it is of particular value in extremely small camera structures. For example, the proportions of the device may be such as to adapt it for use with a relatively small roll of 16 mm. film.

The assembly can be readily opened to permit the loading and unloading thereof and the structure of the film spool, while extremely simple, insures proper engagement by the film spool shaft so the film will be accurately and smoothly fed to successive film frame exposing positions.

It will, of course, be understood that various changes can be made in the form, details, arrangement and proportions of the various parts without departing from the spirit of the invention.

I claim as my invention:

1. In a film cassette, a hollow body having rounded ends and a narrowed central portion and defining a pair of communicating film roll chambers, said body having an open side, a cover seating against the open side of the body comprising rounded ends and a narrowed central portion connecting said ends, and a clip removably engaging the central portion of said cover and the opposite side of said body to hold the cover in place.

2. In a film cassette, a casing defining a film roll chamber, said casing comprising a hollow body with an open side and a cover for said open side, said hollow body having rounded ends and a narrowed central portion and defining a pair of interconnected film roll chambers, said cover for said open side having rounded ends and a narrowed central portion connecting said ends, and a bow spring extending from one side of said casing to the other and engaging said cover to hold it against said open sided body, said spring engaging narrowed portions of the body and cover and extending across the body at the narrowed portion of the body and between the rounded ends thereof.

References Cited in the file of this patent

UNITED STATES PATENTS

| Number | Name | Date |
|---|---|---|
| 1,561,945 | Penin | Nov. 17, 1925 |
| 1,657,755 | Janssen | Jan. 31, 1928 |
| 1,819,337 | Pevear | Aug. 18, 1931 |
| 1,829,332 | Beck | Oct. 27, 1931 |
| 2,005,404 | Wittel | June 18, 1935 |
| 2,166,543 | Hillery-Collings | July 18, 1939 |
| 2,218,966 | Zapp | Oct. 22, 1940 |
| 2,395,590 | Simmon et al. | Feb. 26, 1946 |
| 2,464,673 | Debrie | Mar. 15, 1949 |
| 2,476,996 | Nebel | July 26, 1949 |

FOREIGN PATENTS

| Number | Country | Date |
|---|---|---|
| 572,374 | France | Feb. 20, 1924 |